No. 640,619. Patented Jan. 2, 1900.
B. ALLEN, JR.
BRIDLE BIT.
(Application filed Sept. 21, 1899.)
(No Model.)
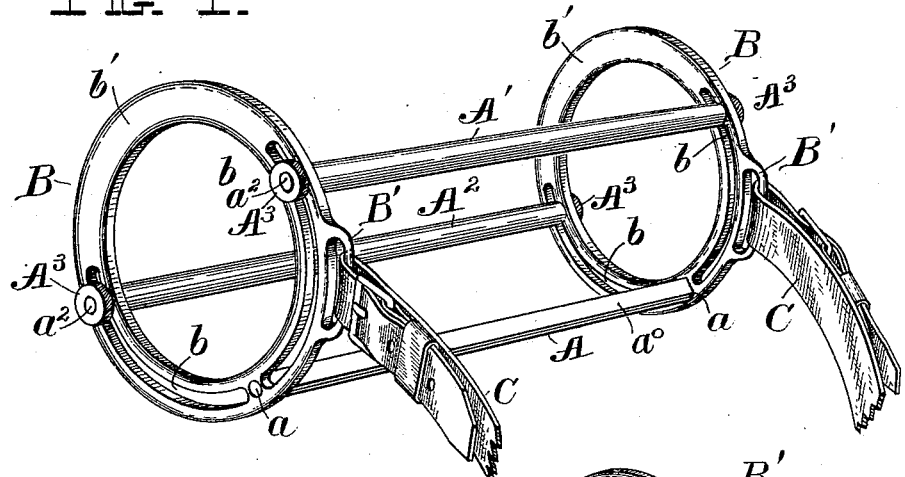
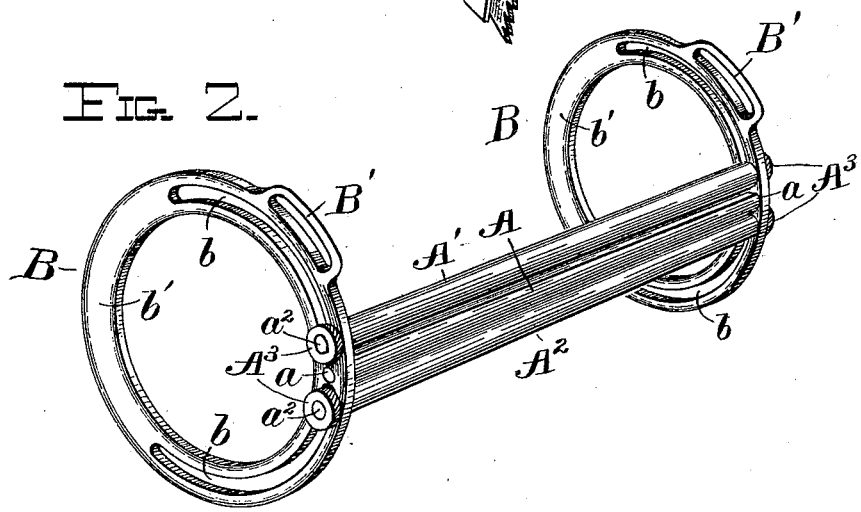
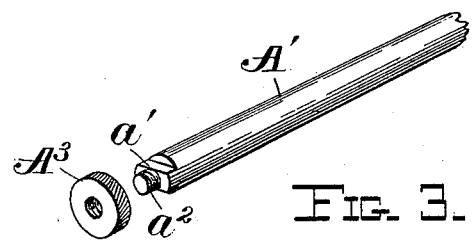
Witnesses
Percy C. Bowen
Clarence A. Bateman
Inventor
Bona Allen, Jr.
by Wilkinson & Fisher
Attorneys

UNITED STATES PATENT OFFICE.

BONA ALLEN, JR., OF BUFORD, GEORGIA.

BRIDLE-BIT.

SPECIFICATION forming part of Letters Patent No. 640,619, dated January 2, 1900.

Application filed September 21, 1899. Serial No. 731,210. (No model.)

*To all whom it may concern:*

Be it known that I, BONA ALLEN, Jr., a citizen of the United States, residing at Buford, in the county of Gwinnett and State of Georgia, have invented certain new and useful Improvements in Bridle-Bits; and I do hereby declare the following to be a full, clear, and exact description of the invention, such as will enable others skilled in the art to which it appertains to make and use the same.

My invention relates to improvements in bridle-bits, the object being to produce a bit which may be used as an ordinary driving-bit and by slight changes in the adjustment of the parts may be used for holding the horse's mouth open for "drenching" or other purposes.

The invention consists of the several parts constructed and arranged as will be hereinafter fully described and claimed.

Reference is had to the accompanying drawings, in which the same parts are designated by the same letters of reference throughout the several views.

Figure 1 is a perspective view of the bit with the bars separated as used for holding the mouth open. Fig. 2 is a similar view showing the bars together as used for ordinary driving. Fig. 3 is a perspective view of one end of one of the bars with the nut detached.

The bit consists, essentially, of three bars $A$, $A'$, and $A^2$, connected together at their ends by the rings B, the bar A being securely fastened at its ends to the rings B, as at $a$. The rings B are provided with slots $b$, extending in opposite directions from the point $a$, where the bar A is secured, each of the said slots $b$ extending about one-third of the distance around the ring, leaving about one-third of the ring solid, as at $b'$. The bars $A'$ and $A^2$ are each reduced at their ends to form flattened lugs $a'$, which fit the slots $b$, and have flat sides to prevent the lugs from turning in the said slots, and the ends of the said bars are still further reduced to form stems $a^2$, which are screw-threaded to receive the nuts $A^3$.

When the bit is put together, the lugs $a'$ on the bars $A'$ and $A^2$ are placed in the slots $b$ in the rings B and the nuts $A^3$ are screwed upon the stems $a^2$, which extend through the slots in the rings.

The bars $A'$ and $A^2$ may be moved to any position within the limits of the slots $b$ and clamped by means of the nuts $A^3$, as will be readily understood.

At any suitable place upon the rings B are formed eyes $B'$, to which the bridle-reins C are attached in the usual manner.

For use as an ordinary driving-bit the bars $A'$ and $A^2$ may be moved around and clamped close to the bar A, which may have its sides flattened, as at $a^0$, as shown in Fig. 1, thus forming practically one bar.

When used for holding the horse's mouth open for drenching or other purposes, the bars $A'$ and $A^2$ are moved away from the bar A, as shown in Fig. 1, the three bars forming a triangle. In this instance two of the bars rest upon the lower jaw and the other bar serves to support the upper jaw, thus holding the mouth open.

The bit may also be formed into what is generally known as a "rough bit" by setting one or both of the bars $A'$ and $A^2$ a short distance away from the bar A, as will be readily understood.

Having thus described my invention, what I claim, and desire to secure by Letters Patent of the United States, is—

1. A bridle-bit composed of two rings; a bar secured at its ends to the said rings; and two bars mounted upon opposite sides of said bar and adjustable about the center of said rings, substantially as described.

2. In a bridle-bit, the combination with rings; a bar fixed at its ends to said rings; and slots in said rings upon opposite sides of said fixed bar; of bars arranged to slide in the said slots, and means for clamping the said bars at any position within the limits of the said slots; substantially as described.

3. In a bridle-bit, the combination with rings; a bar fixed at its ends to said rings; and slots in said rings upon opposite sides of said fixed bar; of bars having their ends reduced to pass through the said slots, and nuts upon the reduced ends of the said bars to secure the latter to the rings; substantially as described.

4. In a bridle-bit, the combination with rings; a bar fixed at its ends to said rings; and slots in said rings upon opposite sides, of said fixed bar; of bars having their ends reduced to fit the said slots, and having threaded stems extending through the said slots, and nuts on the threaded stems to clamp the said bars to the said rings; substantially as described.

In testimony whereof I affix my signature in presence of two witnesses.

BONA ALLEN, Jr.

Witnesses:
   A. V. SULLIVAN,
   A. E. MAYNARD.